(No Model.) 2 Sheets—Sheet 1.
C. W. E. RIPLEY.
KITCHEN TABLE AND DRESSER.
No. 403,139. Patented May 14, 1889.
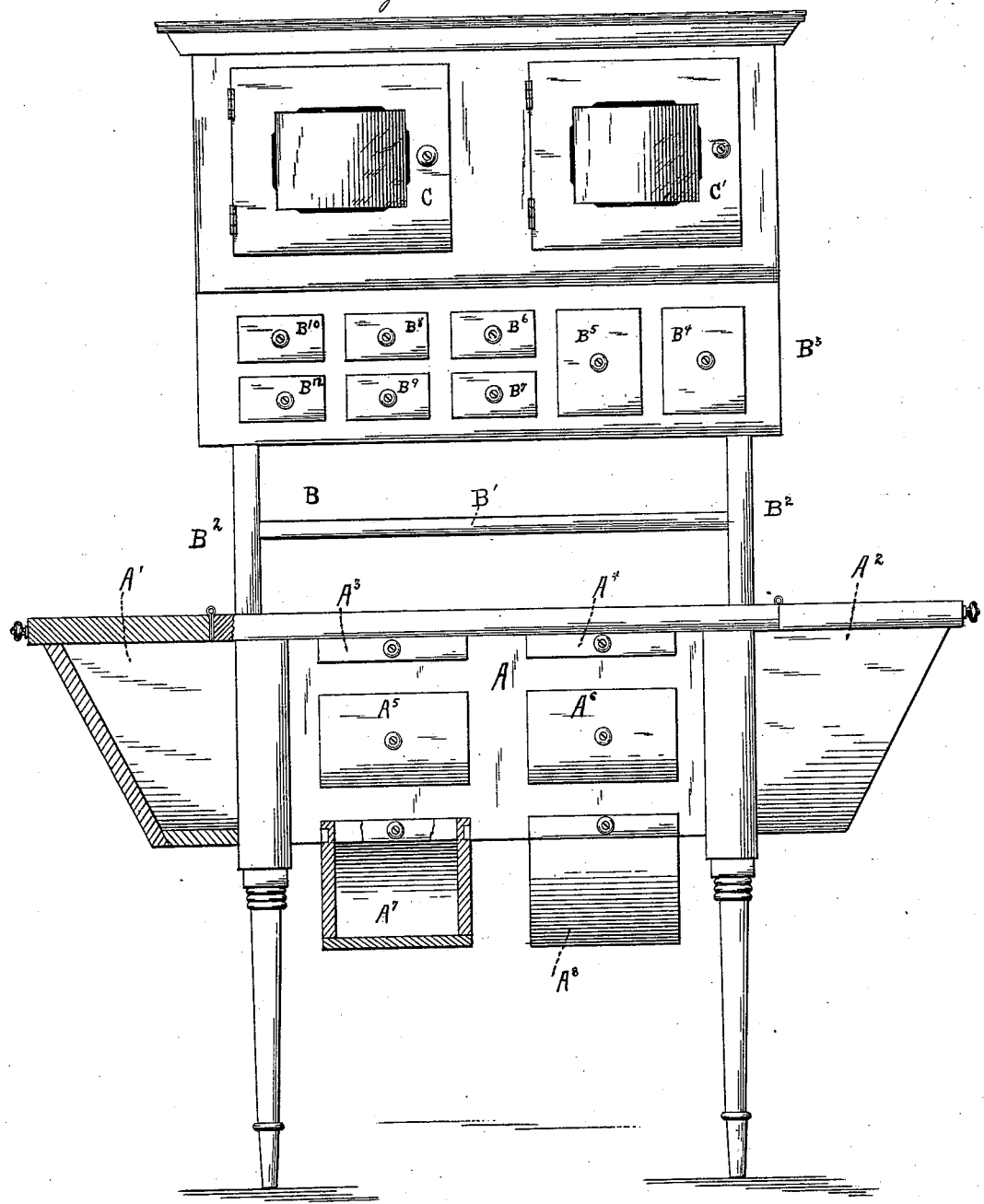

(No Model.) 2 Sheets—Sheet 2.
C. W. E. RIPLEY.
KITCHEN TABLE AND DRESSER.
No. 403,139. Patented May 14, 1889.
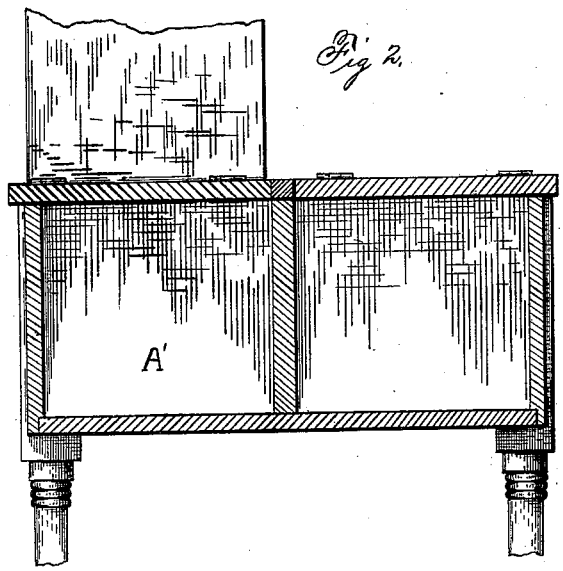
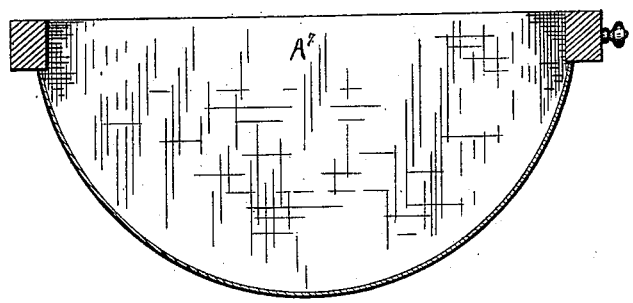
Witnesses.
H. F. Hyatt.
Ledru R. Miller
Inventor.
Chas. W. E. Ripley
By his Attorneys
Halloak and Halleck
N. PETERS, Photo-Lithographer, Washington, D. C.

UNITED STATES PATENT OFFICE.

CHARLES W. E. RIPLEY, OF WASHINGTON, DISTRICT OF COLUMBIA.

KITCHEN TABLE AND DRESSER.

SPECIFICATION forming part of Letters Patent No. 403,139, dated May 14, 1889.

Application filed January 26, 1889. Serial No. 297,675. (No model.)

*To all whom it may concern:*

Be it known that I, CHARLES W. E. RIPLEY, a citizen of the United States, residing at Washington, in the District of Columbia, have invented certain new and useful Improvements in Combination Kitchen Tables and Dressers; and I do hereby declare the following to be a full, clear, and exact description of the invention, such as will enable others skilled in the art to which it appertains to make and use the same.

My invention relates to kitchen tables and dressers.

In all kitchens much time is lost by not having at hand all the articles needed in cooking. This is especially so in regard to what are termed "groceries," which are usually kept in the pantry or scattered over the kitchen. The loss of time consequent upon such an arrangement is a great source of annoyance to the servants and housekeeper.

The object of my invention is to obviate this difficulty by assembling within reach of the person operating at the table all articles that are usually used to aid in cooking, and to provide means for doing many things that now have separate constructions for the purpose.

The invention therefore consists of constructions and combinations, all as will hereinafter be described in the specification and pointed out in the claim, reference being had to the accompanying drawings, in which—

Figure 1 represents a front elevation; Fig. 2, a section of the lower portion of the cabinet shown in Fig. 1; Fig. 3, a section of one of the bins located under the table.

A represents the table. $A'$ $A^2$ are wings on each side to form compartments to store such articles as may be desired, and preferably granulated sugar and cooking-sugar on one side and bread and cornmeal on the other side. The tops or lids of these wings form an extension of the top of the table when closing the bins.

$A^3$ $A^4$ are slides having reversible faces, so that one face can be used for one purpose and the other side for another. The upper side of slide $A^3$ is preferably used to cut bread on and the lower as a dough-board. The upper side of slide $A^4$ is used to prepare meat for cooking, and the lower side for preparing vegetables.

Beneath the slides $A^3$ and $A^4$ are drawers $A^5$ and $A^6$, which may be used for any desired purpose. I prefer to use drawer $A^5$ for kitchen-linen and drawer $A^6$ for knives, forks, and spoons. Beneath these drawers are bins $A^7$ and $A^8$, which are used for holding any desired article. I prefer using bin $A^7$ for flour and sifter, and bin $A^8$ is divided into two parts—one for buckwheat and the other for rice and oatmeal. By this construction I have a complete table which answers all the purposes of an ordinary kitchen. It is often desirable to have other articles at hand, and also to furnish more surface on which to place things that are in use or being made. For example, if pies are being made, pies that are already made will be in the way of the handling of the dough and plates for the next pies, unless the cook places them upon some outer table. To obviate that I provide the shelf-frame B, consisting of the shelf $B'$ and the uprights $B^2$, which in turn support a drawer-frame, $B^3$, that is provided with a number of drawers, $B^4$, $B^5$, $B^6$, $B^7$, $B^8$, $B^9$, $B^{10}$, and $B^{12}$. These drawers contain the usual condiments and spices which are used in cooking. Ordinarily they would have to be put on the table and interfere with the operations thereon. To avoid this feature or annoyance, I utilize the shelf $B'$, upon which the drawers or their contents can be placed and easily reached by the operator.

It will be seen from the foregoing that shelf-frame B serves a double purpose. It supports the parts above it and also renders the manipulation of the articles to be cooked comparatively easy, as it is about midway between the top of the table and the bottom of the drawer-frame, and articles that would otherwise be in the way are removed to the shelf, which is from one-quarter to one-third the width of the table.

The drawers, as before stated, are for the different materials used in cooking. $B^4$ is for coffee, and $B^5$ for tea. The remaining drawers are subdivided. $B^6$ is for nutmeg and cinnamon; $B^7$, for ground allspice and ground cloves; $B^8$, for mustard and ginger; $B^9$, for whole spice and whole cloves; $B^{10}$, for cayenne and black pepper; $B^{12}$, for salt.

It will often be desirable to have a place for storing cooking-furniture, such as molds, cutters, and other utensils used in preparing food for cooking purposes. For this purpose I provide the cupboards C C', each having a suitable door, and, if desired, provided with suitable shelves for holding small articles. In practice I prefer to make all of these parts separable, so that they may be taken from the table and cleaned or repaired when necessary. By making them in this way they are easily handled, and, to prevent any danger of their toppling over, may be secured together by any removable means. The table may also be provided with casters.

It will be noted that the frame B is located upon the table proper—that is, between the wings, so as not to interfere with the lifting of the lids which cover the bins in said wings. The frame B also serves as a stop for the lids when they are raised beyond the point necessary to keep them open while the bin is being filled or emptied.

What I claim as new is—

The combination of the table having wings with lids, a drawer-frame having its drawers arranged substantially as described, and a shelf-frame upon said table between the wings and supporting the drawer-frame, and having a shelf interposed between the top of the table and the bottom of the drawer-frame, substantially as described.

In testimony whereof I affix my signature in presence of two witnesses.

CHAS. W. E. RIPLEY.

Witnesses:
GEO. R. BYINGTON,
M. F. HALLECK.